(12) United States Patent
Scepanski

(10) Patent No.: US 6,777,383 B1
(45) Date of Patent: *Aug. 17, 2004

(54) SOLID DETERGENTS WITH ACTIVE ENZYMES AND BLEACH

(75) Inventor: William H. Scepanski, Bloomington, MN (US)

(73) Assignee: Sunburst Chemicals, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/107,538

(22) Filed: Mar. 27, 2002

Related U.S. Application Data (60) Continuation of application No. 09/906,504, filed on Jul. 16, 2001, which is a continuation of application No. 09/727,599, filed on Dec. 1, 2000, now Pat. No. 6,395,703, which is a continuation of application No. 08/590,273, filed on Nov. 21, 1995, now abandoned, which is a division of application No. 08/443,598, filed on May 17, 1995, now abandoned.

(51) Int. Cl.[7] .................. C11D 17/00; C11D 17/06; C11D 3/08; C11D 7/14

(52) U.S. Cl. .................. 510/441; 510/392; 510/445; 510/452; 510/460; 510/511; 252/527; 252/528

(58) Field of Search ................... 510/392, 441, 510/445, 452, 460, 511; 252/527, 528

(56) References Cited

U.S. PATENT DOCUMENTS

| | | |
|---|---|---|
| 3,595,438 A | 7/1971 | Daley |
| 3,759,834 A | 9/1973 | Parke et al. |
| 4,020,865 A | 5/1977 | Moffat et al. |
| 4,033,894 A | 7/1977 | McLaughlin et al. |
| 4,063,663 A | 12/1977 | Larson et al. |
| 4,292,191 A | 9/1981 | Gray |
| 4,318,818 A | 3/1982 | Letton et al. |
| 4,333,844 A | 6/1982 | Duggleby et al. |
| 4,412,934 A | 11/1983 | Chung et al. |
| 4,430,236 A | 2/1984 | Franks |
| 4,507,219 A | 3/1985 | Hughes |
| 4,515,705 A | 5/1985 | Moeddel |
| 4,537,706 A | 8/1985 | Severson, Jr. |
| 4,537,707 A | 8/1985 | Severson, Jr. |
| 4,595,520 A | 6/1986 | Heile et al. |
| 4,680,134 A | 7/1987 | Heile et al. |
| 4,681,914 A | 7/1987 | Olson et al. |
| 4,774,014 A * | 9/1988 | Kuenzel et al. ............. 510/224 |
| RE32,763 E | 10/1988 | Fernholz et al. |
| RE32,818 E | 1/1989 | Fernholz et al. |

(List continued on next page.)

FOREIGN PATENT DOCUMENTS

EP 06193167 10/1994

OTHER PUBLICATIONS

Lange, Detergents and Cleaners, Handbook of Formulators, Hanser Publishers, 1994, pp 37, 32 ,203, 97–95, 133–163.
Kirk–Othmer's Encyclopedia of Chemical Technology, vol. 9, pp 138–143, 173–226, John Wiley and Sons, Inc., 1980.

*Primary Examiner*—Margaret Einsmann
*Assistant Examiner*—Preeti Kumar
(74) *Attorney, Agent, or Firm*—Patterson, Thuente, Skaar & Christensen, P.A.

(57) ABSTRACT

A detergent composition is described which is a solid homogeneous, evenly dispersed composition containing anionic and nonionic surfactants, soil suspending agents, chelating or sequestering agents, and alkaline builders. The detergent compositions will contain either active enzymes, an oxygen releasing bleaching agent or both. The active enzymes can be protease, amylase or lipase enzymes. Said composition can be used for laundry washing or hard surface cleaning. Manufacturing procedures and methods of use are described.

35 Claims, 1 Drawing Sheet

U.S. PATENT DOCUMENTS

| | | |
|---|---|---|
| 4,846,989 A | 7/1989 | Killa |
| 4,861,518 A | 8/1989 | Morganson et al. |
| 4,911,860 A | 3/1990 | Van Den Brom |
| 4,921,627 A * | 5/1990 | Copeland et al. ........... 510/223 |
| 4,938,893 A * | 7/1990 | Copeland et al. ........... 510/350 |
| 5,080,819 A | 1/1992 | Morganson et al. |
| 5,133,892 A | 7/1992 | Chun et al. |
| 5,213,705 A | 5/1993 | Olson |
| 5,225,102 A | 7/1993 | Coyne et al. |
| 5,288,421 A | 2/1994 | Mandy |
| 5,310,430 A * | 5/1994 | McCall, Jr. ................... 134/33 |
| 5,336,424 A | 8/1994 | Van Vlahakis et al. |
| 5,340,501 A | 8/1994 | Steindorf |
| 5,358,865 A | 10/1994 | Outtrup et al. |
| 5,374,545 A | 12/1994 | Liu et al. |
| 5,384,060 A | 1/1995 | Mandy et al. |
| 5,397,506 A | 3/1995 | Groth et al. |
| 5,407,598 A | 4/1995 | Olson et al. |
| 5,474,698 A | 12/1995 | Rolando et al. |
| 5,556,784 A | 9/1996 | Liu |
| 5,591,703 A | 1/1997 | Sadlowski |
| 5,801,137 A | 9/1998 | Addison et al. |
| 5,830,839 A | 11/1998 | Scepanski |
| 5,861,366 A | 1/1999 | Ihns et al. |
| 6,365,568 B1 * | 4/2002 | Olson et al. ................. 510/511 |
| 6,395,702 B2 * | 5/2002 | Scepanski ................... 510/441 |
| 6,395,703 B2 * | 5/2002 | Scepanski ................... 510/445 |

* cited by examiner

Fig. 1

SOLID DETERGENTS WITH ACTIVE ENZYMES AND BLEACH

This is a Continuation of application Ser. No. 09/906,504 filed Jul. 16, 2001, which in turn is a Continuation of application Ser. No. 09/727,599 filed Dec. 1, 2000, now U.S. Pat. No. 6,395,703 which in turn is a Continuation of application Ser. No. 08/590,273 filed Nov. 21, 1995, now abandoned which in turn is a Divisional of U.S. application Ser. No.08/443,598 filed May 17, 1995, now abandoned.

FIELD OF THE INVENTION

The invention relates to solid detergents. The invention relates more specifically to solid detergents having enzymes and stable oxygen-releasing bleaching agents that are stable upon storage of the detergent.

BACKGROUND OF THE INVENTION

Detergent systems for laundry, warewashing, hard surface cleaning (food plant, institutional, industrial, transportation), and numerous other similar applications have long been available where powders are manually scooped into water and dissolved. The resulting detergent solution is applied to the surface or article being cleaned. Also, concentrated liquid detergents have been found to be highly desirable by certain consumers. Important considerations in the selection of a detergent composition include ease of handling, cleaning ability and stability of the product during storage. The basic ingredients of a detergent are surfactants, which emulsify and suspend soils, and alkaline builders, which saponify fats and oils.

One advantage of powder detergents is the high concentrations of active ingredients because few or no inert ingredients are required. In powder detergents, high levels of inorganic or organic salts can be used to raise alkalinity and soften water by chelating or sequestering water hardness ions. The powdered detergents can be used to provide oxidizing agents (bleaches) or reducing agents (for example, sodium thiosulfate) and granular enzyme materials, which can be blended into free flowing powder detergents. The oxidizing or reducing agents and the enzymes are stable in the powdered detergents with no significant loss of activity on extended storage.

A significant disadvantage of powder or granular detergents for commercial applications is that they are not as accurately controllable in dispensing equipment as liquids. Powder systems can require manually scooping a quantity of powder for each use, thus not taking advantage of the ease, accuracy and hands-off labor savings of liquid dispensers. Also, powders can cake if exposed to high humidity or temperatures. Once they become caked, they cannot be subsequently removed from their shipping container. Powders can lose some of their activity if moistened or exposed to high humidity. Non-homogeneous powders can segregate in their shipping containers, that is, separate or stratify by particle size or density resulting in a non-uniform mixture that may not be appropriate for ultimate use applications. Furthermore, powders can create a safety hazard in that granules or airborne dust particles of irritating or corrosive materials can exit their container or otherwise come in direct contact with tissue causing burns or discomfort.

To improve handling and dispensing, free flowing powder detergents or tacky bulk powder detergents have been poured from premeasured packets or scooped from drums into convenient sized dispensers with a relatively fine mesh screen holding the powder above a spray nozzle. To deliver the detergent from the dispenser, water sprays through the screen to dissolve the powder with the resulting solution or slurry being delivered to the use site or a suitable container. Use of the screened off dispenser allows the utilization of the powder detergents in commercial applications with some of the dispensing advantages found with liquids. But this method of dispensing powder detergents has some disadvantages.

At the powder/screen/water interface there is exposure to high temperature, humidity, pH and electrolyte concentration. This harsh environment at the interface can deactivate enzymes or decompose peroxy bleach compounds when moistened. In addition, moisture levels would rise in the remaining suspended powder causing hydration interactions in the entire mass of the powder. By the time that the powder at the top of the mass has worked its way down to the screen and has been dissolved, some or all of its activity has dissipated.

One advantage of liquid detergents is the ease of handling because liquids can be automatically pumped or dispensed directly to their final use application. The liquid detergents can also be made into a highly concentrated intermediate aqueous solution, which is subsequently flushed/diluted to its proper final use application solution. Liquid detergents are generally more rapidly soluble than powder detergents with the same or comparable active ingredients. Liquid detergents can use higher levels of some surfactants that would cause powders to cake if used at similar levels.

Almost all liquid detergents have the disadvantage that they are diluted with water, so larger volumes and weights have to be shipped, stored and used to accomplish the equivalent cleaning as a highly concentrated powder. Also, liquid detergents cannot tolerate high concentrations of organic surfactants with dissolved inorganic builders and sequestering agents with all the ingredients remaining homogenous throughout its shipping and storage. Many liquid detergents utilize high concentrations of corrosive chemicals, which easily spill or splatter on users causing chemical burns, blindness or discomfort. Liquids can be corrosive to their dispensing equipment by virtue of the caustic alkali being incompatible with pump parts or delivery tubing.

The ingredients within liquids interact because the ingredient molecules are mobile. These interactions can precipitate or irreversibly inactivate some of the active ingredients upon storage. For example, enzymes are not compatible with strong sequestering, chelating or calcium precipitating agents for long-term storage stability in aqueous liquid compositions. Enzyme activity decreases if the enzymes are stored in an aqueous detergent product containing high pH, strong oxidizing agents or strong sequestering or chelating agents such as phosphates, carbonates, aminocarboxylates, polyacrylates or phosphonates.

Liquids, for the most part, do not allow a stable, homogeneous solution of surfactants, builders, sequestrants and oxygen bleach source in a compatible stable product with long term storage stability. Liquid products in the marketplace do not have a stable combination of enzyme or peroxy bleach with all of the other components of an effective cleaning system. Several different products are required because the components of the liquid products are not compatible if mixed in one product.

Attempts have been made to stabilize liquid detergent compositions. U.S. Pat. No. 4,318,818 to Letton et al. describes a stabilized aqueous enzyme composition having calcium ions, a pH between 6.5 and 10, a low molecular weight alcohol and a low molecular weight carboxylic acid salt which together act to stabilize the enzyme. U.S. Pat. Nos. 4,537,706 and 4,537,707 to Severson, Jr. disclose the use of boric acid together with calcium ions and formate to stabilize enzymes in liquid detergents. These compositions show increased enzyme stability, but they still show enzyme degradation over periods of many weeks when stored at elevated temperatures (100° F.–120° F.).

Similar efforts have been made to stabilize bleach in liquid detergents. U.S. Pat. No. 4,430,236 to Franks describes a liquid detergent containing a hydrogen peroxide bleach that is relatively stable at room temperature over a period of months. U.S. Pat. No. 4,507,219 to Hughes focuses on improved stability of a chlorine bleach in a liquid detergent. These compositions contain low concentrations of alkanolamines to stabilize the chlorine bleach. Careful blending is required to achieve a product that remains isotropic and stable. As a result of these efforts, some combination liquid products exist but none with the attributes of having alkaline builders, high levels of surfactants, high levels of water conditioning/sequestering/chelating agents, enzymes and oxygen bleach all in one product which is easily, safely and accurately dispensed into a laundry machine, or hard surface cleaning apparatus.

As a result of these compatibility problems, liquid products are often dispensed as several products to be mixed in the final use solution at the ratio desired and at the time needed for the desired result. For example, a liquid highly alkaline laundry builder product is pumped by a dispenser into the wash cycle of a laundry washing operation. At the same time, a second liquid product containing surfactants and enzymes is pumped into the washer. In subsequent steps in the washing cycle, a bleaching agent may be added to remove stains and enhance the color or whiteness of the fabrics.

Because of the difficulties with both powder detergents and liquid detergents, solids offer an attractive alternative. For example, solids can be dispensed from inverted containers without suffering the same problems as powders since a wire screen is not needed. Powders by their nature have very large surface areas susceptible to humidity. Solid cast detergent capsules improve this situation because the solid remains intact with a small surface area as the solid is selectively dissolved to release just enough detergent for the particular job. The only surface of the detergent susceptible to the effects of moisture or humidity is the surface exposed to water, which is dissolved at the time of the next utilization.

Limited types of solid detergents have been used. U.S. Pat. No. 4,861,518 to Morganson et al. divulges a solid floor cleaner that is specifically formulated not to form a film after use. U.S. Pat. No. 5,397,506 focuses on an improved fat removing solid cleaner that contains a $C_{1-18}$ alkyl dimethylamine oxide surfactant. U.S. Pat. No. Re. 32,818 to Fernholz et al. discloses a cast solid detergent containing 30 to 60% by weight alkali metal hydroxide that is hydrated. The detergent can also contain a chlorine source and a defoamer. U.S. Pat. No. Re. 32,763 claims corresponding methods of producing these solid detergents based on alkali metal hydroxide. Another alkaline based solid detergent is discussed in U.S. Pat. No. 5,340,501 to Steindorf. While these types of products have a limited surface area for interactions with water and humidity, they do not contain enzymes or oxygen bleach sources.

SUMMARY OF THE INVENTION

The detergent composition within the invention is unique in that it incorporates many of the advantages of free flowing powder or granular, and pumpable liquid detergents in one product and eliminates the disadvantages of each. The solid detergent will contain either an active enzyme, a peroxide bleach or both. The enzyme or peroxide will be relatively stable upon long storage of the solid detergent.

This invention consists of a solid mass, which is essentially homogeneous on the scale of quantities used in any typical application for the detergent. In other words, while the solid may not be a homogeneous solid mixture on a microscopic level, any granules will be dispersed to form an effectively uniform mass for any practical applications. The detergent composition can contain a nonionic surfactant, an anionic surfactant, an alkaline builder and a metal sequestering agent. The total surfactant concentration will generally range from greater than 30 to less than 99 percent by weight of the detergent composition.

The surfactants are melted to form a liquefied mass, then other active detergent ingredients are added to the liquid mass. Care must be taken in the order of addition and in the temperature at which each component is added to insure stability and effectiveness of the enzyme components, the oxygen bleach source, i.e., peroxide, and to prevent adverse chemical interactions among the ingredients. Any peroxides and enzymes are added near the end of the production procedure after the detergent solution has cooled to some extent. When all of the components have been added and mixed to a now thick, effectively homogeneous suspension/dispersion, the product is removed from the mixing vessel and poured into jars, plastic or fiber containers or poured into molds where it cools below its melting point and solidifies.

If the solid mass is in a container, it can be utilized by spraying water on the exposed surface of the product where it dissolves in the water and is drained, pumped or injected to its final use application. Alternatively, if the detergent is poured into molds, the block (cake, puck, brick) can be added directly to water as in a bucket or laundry machine or dissolved in water in a receptacle where it is then transferred to the final application.

DETAILED DESCRIPTION OF THE INVENTION

The detergent compositions of the invention can include a mixture of nonionic and anionic surfactants, chelating or scale inhibiting agents and alkaline builders. The detergent compositions will also include either enzymes, oxygen releasing bleach or both. Other standard additives, such as brighteners, dyes, soil suspending agents, defoamers and perfumes can be added to the detergent during manufacture. The detergent mixtures are formed into a solid at the end of a melting and cooling process. The enzymes and peroxy bleaches are stable in the solid detergents upon storage of the product for significant storage times.

The process of producing the solid detergents is important to the production of a detergent mixture with stable and active enzymes and detergent bleaches. A melt based process is used to produce the solid detergents. Significant features of the manufacturing process include the melting temperatures used, the order of addition of the ingredients and the rate of cooling. The manufacturing process is described in more detail below.

A detergent within the invention will generally contain 0 to 70 percent by weight of nonionic surfactants relative to the detergent weight. A wide variety of nonionic surfactants are known within the field and can be used within the present invention. The choice of nonionic surfactant depends on the melting point of the surfactant, the melting point of the final product and the intended use for the product. A mixture of nonionic surfactants can also be used. If a solid (at room temperature) nonionic surfactant is used within a mixture of nonionic surfactants, a liquid nonionic surfactant can also be used while still obtaining a solid detergent. Particular nonionic surfactants which can be used in detergents of the invention include:

- Nonylphenol ethoxylates with 4–100 ethylene oxide groups per nonylphenol molecule, i.e., nonylphenol (ethoxylate)$_n$, n=4–100
- Dinonylphenol ethoxylates with 4–150 ethylene oxide groups per dinonylphenol molecule
- Linear alcohol ethoxylates with the alcohol chain consisting of 6–24 carbon atoms and with 2.5 to 150 ethylene oxide groups per alcohol molecule
- Dodecylphenol ethoxylates with 4–100 ethylene, oxide groups per dodecylphenol molecule
- Octylphenol ethoxylates with 4–100 ethylene oxide groups per octylphenol molecule
- Alkanolamides in which, the carbon chain consists of a $C_{12}$–$C_{18}$ fatty acid reacted with mono or diethanolamine or isopropanolamine to yield a product having a melting point above 100° F.
- Ethoxylated alkanolamides in which the carbon chain consists of a $C_{12}$–$C_{18}$ fatty acid reacted with ethylene oxide and mono or diethanolamine or isopropanolamine
- Amine oxides having a carbon chain from $C_8$ to $C_{18}$
- Fatty acid ethoxylates with 2–40 ethylene oxide per fatty acid where the fatty acid has a carbon chain from $C_8$–$C_{18}$.

The preferred detergents will use nonionic surfactants which include dinonylphenol ethoxylates or alkanolamides either alone or in mixtures with other nonionic surfactants. Preferred dinonylphenol ethoxylates and alkanolamides are solids at room temperature.

A detergent within the invention will generally contain 0 to 70 percent by weight anionic surfactant for a total surfactant concentration between 30 percent and 99 percent by weight of detergent. Anionic surfactants which could be included in this product include, but are not limited to, all of the following:

1. Alkyl sulfonate salts and alkylaryl sulfonate salts, supplied with the sodium, potassium, ammonium, protonated mono, di or tri-ethanolamine or protonated isopropanolamine cations, such as the following salts:
    Linear primary $C_6$–$C_{18}$ sulfonate salt
    Linear secondary $C_3$–$C_{18}$ sulfonate salt
    Alpha Olefin sulfonate salt
    Dodecylbenzene sulfonate salt
    Tridecylbenzene sulfonate salt
    Xylene sulfonate salt
    Cumene sulfonate salt
    Toluene sulfonate salt
2. Alkyl sulfate salts and alkylaryl sulfate salts, supplied with either Na, K, NH$_4$, protonated mono, di or tri-ethanolamine or protonated isopropanolamine cations, such as the following salts:
    Linear primary $C_6$–$C_{18}$ sulfate salt
    Linear secondary $C_3$–$C_{18}$ sulfate salt
    $C_{12}$–$C_{13}$ benzene sulfate salt
3. Alkyl $C_6$–$C_{18}$ naphthalene sulfonate salts with Na, K or NH$_4$ cations.
4. Alkyl $C_6$–$C_{18}$ diphenyl sulfonate salts with Na, K or NH$_4$ cations.
5. Alkyl ether sulfate salts or alkylaryl ether sulfate salts supplied with Na, K, NH$_4$, protonated mono, di or tri-ethanolamine, or protonated isopropanolamine cations, such as the following salts:
    Alkyl $C_8$–$C_{18}$ alcohol (ethoxylate)$_{1-6}$ sulfate salt.
    Alkyl $C_8$–$C_{12}$ phenoxy (ethoxylate)$_{1-12}$ sulfate salt.
6. Alkyl ether sulfonate salts or alkylaryl ether sulfonate salts supplied with Na, K, NH$_4$, protonated mono, di or tri-ethanolamine or protonated isopropanolamine cations, such as the following salts:
    Alkyl $C_8$–$C_{18}$ alcohol (ethoxylate)$_{1-6}$ sulfonate salt.
    Alkyl $C_8$–$C_{12}$ phenoxy (ethoxylate)$_{1-12}$ sulfonate salt.
7. $C_4$–$C_{18}$ dialkyl sulfosuccinate salts supplied with Na, K, NH$_4$, protonated mono, di or tri-ethanolamine or protonated isoproponolamine cations, such as disodium dioctyl sulfosuccinate.
8. Other anionic surfactants such as mono or dialkyl phosphate ester salts, isothionate or taurate salts.

The choice of anionic surfactant will generally be based on the same factors as the choice of nonionic surfactant. The relative amounts of nonionic and anionic surfactants will be based on the cleaning ability desired for the final product since each type of surfactant will tend to work best with certain types of soil.

Alkaline builders are water soluble bases added to detergent compositions to raise the pH of the cleaning solution. The alkaline builders have cleaning ability of their own, and they improve the function of the surfactants. The detergents of this invention include 0 to 50 percent by weight alkaline builder. These materials are suspended in the mass of the solid detergent during the production process. The amount of alkaline builder used will depend on the relative amounts of surfactants desired to achieve the proper cleaning effect. Too much alkaline builder should not be used such that it will not become properly suspended in the melted surfactant during the manufacturing process.

Powdered, bead, liquid or granular alkaline builders can be used in the formulation of detergents of the invention. Generally, any water soluble base is appropriate, although certain bases are commonly used as alkaline builders in detergent compositions. Some alkaline builders that can be included in this product are: sodium or potassium silicate, sodium or potassium carbonate, trisodium or tripotassium phosphate, Na$_2$HPO$_4$, K$_2$HPO$_4$, sodium hydroxide, potassium hydroxide, monoethanolamine diethanolamine, triethanolamine.

Chelating, sequestering or scale inhibiting ingredients are added to the detergent to neutralize the adverse consequences of having divalent and trivalent ions of calcium, magnesium, and iron and other less significant polyvalent metal cations in the washing solution. These divalent and trivalent cations enter the cleaning system with the water that is used as the main solvent in washing and rinsing, and with the soils present in the system that are to be removed. These divalent and trivalent ions reduce the effectiveness of detergents. Subsequent reference to "hardness ions" refers to calcium, magnesium and, to a lesser degree, iron and other cations which are found in "hard water".

With the use of anionic surfactants, the hardness ions can combine with the anionic surfactant which not only reduces the surfactant's utility in solubilizing unwanted materials, but which can also precipitate the surfactant. If the surfactant precipitates, this adds to the soil with precipitated surfactant instead of removing it. The precipitated surfactant results, for example, in greasy films on hard surfaces or in gray to yellow tints on fabrics when used in laundry detergents. Hardness ions can also precipitate fatty acids present in soils to prevent the solubilization and removal of the fatty acids by the surfactants. Inorganic anions such as carbonate, phosphate, silicate, sulfate, hydroxide and others can precipitate with hardness ions to form inorganic films, spots or deposits on hard surfaces and cleaning machines and devices or to form graying and discoloration of fabrics from the deposit of inorganic particles. We use the term sequestering to cover generally chelating and sequestering of metal ions that results in scale inhibition.

Sequestering or scale inhibiting chemicals will prevent these adverse effects because they bind the hardness ions. Binding of the sequestering agent to the ions keeps the hardness ions in solution and prevents the hardness ions from precipitating with the aforementioned organic and inorganic anions. Therefore, addition of sequestering agents prevents mineral scale from building up on cleaning equipment, hard surfaces or fabrics being cleaned and promotes the rinsing of any residual hardness ion/sequestering agent complex that may have dried onto the substrate during the cleaning process.

Hardness metal sequestering agents will be present in the detergents of the invention at concentrations between 0 and 50 percent by weight of detergent. Well known sequestering agents can be used in this invention, including, but not limited to, the following which are commercially available and commonly used in detergent formulations:

1. Sodium, potassium, and ammonium salts of orthophosphate or polyphosphates such as pyrophosphate, tripolyphosphate, trimetaphosphate, hexametaphosphate or other higher complex phosphates having up to 22 phosphorus atoms in the anion.
2. Ethylenediamine tetraacetic acid or its fully or partially neutralized salts, e.g., sodium, potassium, ammonium or mono, di or triethanolamine salts.
3. Nitrilotriacetic acid or its full or partially neutralized salts, e.g., sodium, potassium, ammonium or mono, di or triethanolamine salts.
4. Other aminocarboxylic acids and their salts, for example:
   pentasodium diethylenetriamine pentaacetate
   trisodium hydroxyethyl ethylenediamine triacetate
   disodium ethanoldiglycine
   sodium diethanolglycine
5. Organic polycarboxylic acids and their salts, such as, oxalic acid, citric acid and gluconic acid.
6. Polyacrylic acid polymers and the sodium, potassium, ammonium or mono, di or triethanolamine salts from molecular weight 800 to 50,000.
7. Copolymers, of acrylic and maleic acid and the sodium, potassium, ammonium or mono, di or triethanolamine salts with molecular weights greater than 800.
8. Copolymers, of acrylic acid and itaconic acid and the sodium, potassium, ammonium or mono, di or triethanolamine salts with molecular weights between 800–50,000.
9. Copolymers, of maleic acid and itaconic acid and the sodium, potassium, ammonium or mono, di or triethanolamine salts with molecular weights between 800–50,000.
10. Amino trimethylene phosphonic acid and its sodium, potassium, ammonium or mono, di or triethanolamine salts.
11. 1-Hydroxyethylidine-1, 1-diphosphonic acid and its sodium, potassium, ammonium or mono, di or triethanolamine salts.
12. Hexamethylenediamine tetra(methylenephosphonic acid) and its sodium, potassium, ammonium or mono, di or triethanolamine salts.
13. Diethylene triamine penta(methylene phosphonic acid) and its sodium, potassium, ammonium or mono, di or triethanolamine salts.
14. Dequest 2041™ by Monsanto, which is a similar substituted phosphonic acid or salt.

Detergent enzymes have long been known to enhance cleaning, remove stains and solubilize organic soils otherwise insoluble in water. Their usefulness is evidenced by the many granular and liquid products on the market containing enzymes. However, the sequestering, or scale inhibiting agents mentioned above, although beneficial to cleaning, are detrimental to the stability of these detergent enzymes. These enzymes are naturally occurring water soluble proteins that are isolated from bacterial cultures.

Detergents of the present invention may contain enzymes at total concentrations between 0 to 40 percent by weight of detergent. The enzymes of interest are types that break down certain biological molecules into smaller molecules. Generally, all that is known about the enzymes are the class of compounds that they are active in breaking down. Typical batches of enzyme sold under trade names can include multiple enzymes that are copurified.

One method to enhance the stability of enzymes in liquid detergents is to add a small amount of $Ca^{++}$ to the liquid enzyme raw material and a further small amount of $Ca^{++}$ in the finished detergent product. The addition of the $Ca^{++}$ will extend the enzyme's shelf life in the liquid detergent. If strong chelating, sequestering or scale inhibiting agents are present in a liquid product where they are free to move about in the solution, they will remove any free $Ca^{++}$ from the detergent products by binding with the $Ca^{++}$. At equilibrium, the chelating agents prevent $Ca^{++}$ from interacting with the enzyme. Eventually these chelating agents tie up all of the free $Ca^{++}$, and $Ca^{++}$ previously bound to the enzyme. Since the $Ca^{++}$ is no longer available to stabilize the enzyme, the enzyme loses its activity.

As previously noted, enzymes in granular products do not have the same potential for instability as enzymes in liquid detergent products. Powdered or granular products do not lose their enzyme activity because the enzyme is immobilized in small particles where it is unable to move about and contact the sequestering or scale inhibiting agents, which would, in aqueous solution, remove the stabilizing $Ca^{++}$ from the particle. These granular type products, however, have dispensing and handling disadvantages as stated previously.

In this invention, incorporation of an enzyme in a solid mass allows maintenance of enzyme stability even upon mixing with powerful $Ca^{++}$ chelators/sequestrants. Powerful $Ca^{++}$ sequestrants are defined as those sequestrants which have a log calcium sequestrant equilibrium stability constant greater than 4.7. Furthermore, the solid mass of this invention can be dispensed with the ease, safety and accuracy of liquids. Still, the process of producing the solid detergent must be performed so that the enzymes are not deactivated during the production process itself.

Enzyme manufacturers generally recommend processing temperatures when manufacturing liquid detergents between 30–40° C. Batches of solid detergent have been produced by the present inventor with enzyme added to liquid mixtures at temperatures as high as 93° C. without destroying the enzyme's activity, although a slight loss of activity was observed. This surprising stability is unexpected in light of the manufacturer's recommendation. As described below, we find that the enzymes can retain their activity during a melt process for forming a solid detergent that subject the enzymes to elevated temperatures (greater than 140° F. or 60° C.) for brief periods of time.

Enzymes are also generally recommended to be formulated into liquid systems at pH values between 7.0–10.5 depending on the enzyme. Using a typical, i.e., representative, solid detergent product of this invention, a pH of 12.2 is found for a 1% detergent solution by weight, and a pH of 12.5 is found for a 10% detergent solution. Obviously, the invention allows for the rapid production of detergent solutions with higher alkalinity from a product that can be stored with stable enzyme activity. The pH of these aqueous detergent solutions is higher than is recommended by enzyme manufacturers for enzyme storage stability in liquid detergents.

Enzymes that can be included in this type of invention include protease, amylase, lipase and cellulase enzymes. Each of these types of enzymes will occur in concentrations between 0 and 20 percent and between 0.1 and 40 percent by weight of detergent. Protease enzymes are particularly effective in enhancing the cleaning performance of detergents. Many manufacturers of enzymes offer products directed toward the detergent industry for use in cleaning products. Enzymes which could be included in this product, but are not limited to all of the following:

|  | Manufacturer |
|---|---|
| Protease | |
| Alcalase ™ | Novo Nordisk A/S |
| Esperase ™ | Novo Nordisk A/S |
| Savinase ™ | Novo Nordisk A/S |
| Optimase ™ | Solvay Enzymes |
| Opticlean ™ | Solvay Enzymes |
| Maxacal ™ | Gist Brocades Industries |
| Maxatase ™ | Gist Brocades Industries |
| Amylase | |
| Termamyl ™ | Novo Nordisk |
| Optimase PAL, PAG ™ | Solvay Enzymes |
| Opticlean M. Solvay Amylase MT ™ | Solvay Enzymes |
| Rapidase ™ | Gist Brocades Industries |
| Cellulase | |
| Cellusoft ™ | Novo Nordisk |
| Lipase | |
| Lipolase ™ | Novo Nordisk |
| Pancreative Lipase 250 ™ | Solvay Enzymes |

The detergent compositions of the invention may contain peroxy bleaching agents (oxidizing agents) which release oxygen, in order to enhance whiteness or brightness of colors in laundry applications or aid in soil and stain removal in hard surface cleaning. The concentration of peroxy bleaching agent will range from 0 to 40 percent by weight of detergent.

Hydrogen peroxide has been used in liquid combination laundry products with surfactants to make institutional laundry detergents. These hydrogen peroxide systems would not form a stable laundry product with the addition of useful quantities of alkaline builders, sequestering, scale inhibiting or enzyme ingredients.

Powdered or granular detergents have been sold for many years with sodium perborate or sodium percarbonate as the oxygen source. These powder or granular detergents are stable products with the disadvantages in dispensing or use application as previously discussed for powdered or granular detergents. Even these powdered detergents may also lose bleaching activity if stored in a moist area or in a moist condition. Perborates and percarbonates can be formed from the reaction of hydrogen peroxide with borates or carbonates. In recent years, organic peroxides, which can serve as useful oxidizing agents, have come into use in powder detergents. Examples of these organic peroxides include benzoyl peroxide, dicumyl peroxide, Di(2-tert-butyl peroxy isopropyl) benzene and organic peroxy acids to name just a few.

The solid nature of this invention allows the peroxide to be stable for extended storage periods (see Table 1) in the presence of high effective pH and high effective electrolyte concentrations without decomposing the peroxides. By extrapolating the data in Table 1, a half-life of 17 months is obtained for the active peroxide in the product. Moisture contacting the dissolving surface of the mass does not release oxygen from the decomposition of the peroxide throughout the entire mass as with powder or granular products. A further discovery in this invention is that peroxide containing detergent combinations will assist in protein decomposition, which makes removal of proteinaceous soils more effective. The peroxide acts as more than just a bleach to oxidize the color in stain; it actually helps remove protein soils. remove protein soils.

Stability of oxygen in a typical detergent product of the invention upon storage is demonstrated by the results depicted in Table 1:

TABLE 1

| Sample | PPM/O2 in Solution | % Activity Lost |
|---|---|---|
| Fresh | 637.5 | 0 |
| 1 Week | 600 | 5.9 |
| 130 Days | 525 | 17.6 |

The concentration of peroxide is determined by reacting a five percent by weight aqueous detergent solution with excess potassium iodide to form a stoichiometric amount of $I_2$. The resulting solution is titrated with sodium thiosulfate until the brown color indicative of $I_2$ is removed.

Stringent controls over the manufacturing process and formulation content must be observed to prevent release of oxygen from the decomposition of the peroxide during the manufacturing process. If the peroxy compound is preferably added when the temperature is above about 160° F. or if there is more than 5% water present, the mass will begin to expand as the oxygen bubbles are released throughout the mass, and the product will not solidify properly upon cooling. Generally, the free water is minimized to only the amount inherent in the raw materials. The temperature is preferably below 145° F. before peroxide compounds are added, and the peroxy compound is added last to minimize or eliminate the evolution of oxygen during manufacturing solidifying and final packaging.

The preferred peroxy bleaching agent is sodium percarbonate. Sodium perborate is more susceptible to releasing oxygen in the manufacturing process at lower temperature. Hydrogen peroxide, in concentrated aqueous solution, will tend to evolve oxygen, i.e., decompose, upon being added to the mixture. Organic peroxides and peroxy acids are less desirable because of their high cost per oxidizing activity.

However, the invention is not limited to the particular peroxides discussed here.

Additional ingredients, which are often added to detergent formulations, may or may not be added to the invention including fragrances, optical brighteners, peroxygen activators, soil suspending agents, defoamers, colorants, and the like without generally effecting the stability of either the enzymes or the peroxide bleaches. These are added in concentrations ranging from 0 to 10 percent by weight.

The general procedure followed in preparing this product involves heating the nonionic surfactants above the melting point of the highest melting point nonionic surfactant ingredient to make a homogeneous, low viscosity fluid (less than 40 centipoise). The anionic surfactants are added next and melted to form a liquid solution with the nonionic surfactants. Then, the remaining solid ingredients are added sequentially and kept in uniform homogeneous suspension until packaged into their final form. Any peroxides are added last or nearly last and any enzymes are added immediately before the peroxides, although this order can be reversed. The heating is generally stopped before the addition of any peroxides or enzymes, so the detergent is slowly cooling as the last ingredients are added. Further details of the procedure are presented below.

Preferred solid detergents of the invention will contain alkyl ethoxylate nonionic surfactants. In the production of these preferred detergents, the alkyl ethoxylate nonionic surfactants are first added and heated to 185° F. The alkanolamides or other nonionic surfactants and the anionic surfactants, (except sulfosuccinates, which are added just before the enzymes when the temperature is below 150° F.) are added and mixed until melted while the temperature of the batch is kept between 185°–210° F. Agitation of the batch is continued, but no further heating is usually required. The batch temperature is slowly, intentionally reduced by cooling with heat exchangers or jacketed tank water circulation or incidentally by ambient loss of heat or addition of subsequent ingredients with lower ambient temperatures.

In no specific or required order, the alkaline builders, chelating, sequestering or scale inhibiting agents are added with mixing. These materials do not necessarily dissolve, and they can remain discrete particles suspended essentially uniformly in the increasingly viscous, cooling fluid. As the solution cools mostly by the addition of cooler raw materials, its viscosity increases which aids in the suspension of the granular particles.

The detergent solution should preferably cool below 160° F., more preferably below 150° F., at which time the enzymes can be added with continuous mixing, either in a liquid or a granular form. Finally, with the temperature preferably below 150° F., more preferably below 145° F., the peroxide can be added, rapidly followed by any miscellaneous ingredients such as optical brighteners, dye, perfume or peroxy activators. The heat sensitive ingredients, the peroxy bleaches and the enzymes, can be added at higher temperatures, but there is a greater risk that the ingredients will be inactivated by the heat before the detergent materials cool. The miscellaneous ingredients can be added earlier if desired. It may be preferable to add these miscellaneous ingredients before the addition of the enzymes or the peroxides.

At this point, the relatively highly viscous but flowable mass is now ready for packaging. The detergent may require mild heating to reduce the viscosity just enough to enable it to flow from the mixing vessel into final packages. Alternatively, if the temperature is too high, the detergent may require cooling to insure stability of the enzyme and/or peroxy compound and to keep the viscosity high enough to prevent the granular materials from settling to the bottom of the final package before solidification immobilizes the suspended or dispersed granules. The preferred temperature range for packaging is 130–145° F.

A person of ordinary skill in the art can adjust the temperatures and order of addition of the ingredients based on the particular ingredients used employing the description here as a guide. A main feature of the production process is that the enzymes and peroxides are added toward the end of the production process as the detergent mixture has begun to cool.

The viscosity of the final mixture, before packaging, can also be reduced by adding small amounts of oxygenated solvents such as alcohols, glycols or glycol ethers. The viscosity can be increased by adding small additional amounts of the surfactants with melting points above 100° F. but below 150° F. Packaging into final use containers should be done as quickly as possible. The faster the product cools and solidifies the better the stability of the enzyme and peroxy compounds, and the more homogeneously dispersed the granular materials will be. The detergent mixtures can be packaged in containers, such as plastic jars or the detergent mixtures can be solidified in molds to produce solid blocks or tablets of the solid detergent.

A general method of use of a solid detergent of this invention is to dissolve the solidified product in water by appropriate and convenient means for the user to form a detergent solution. The solution formed can be directly used or diluted further before use. One preferred method of utilizing this invention employs the solid detergent plastic jars with an approximate volume of 1 to 5 quarts having an opening of 25 to 200 mm. Larger containers of up to 55 gallon open head drums may be used. Another preferred method of using the detergent of the invention involves blocks or tablets of the detergent that can be directly used to produce a detergent solution.

When the detergent is used from a container, the container with the cooled and solidified detergent can be placed inverted into a bowl especially designed to dissolve solid detergent products. Water is sprayed upward into the inverted container dissolving the detergent. An example of an appropriate dispenser is given in U.S. Pat. No. 5,342,587 to Laughlin et al., entitled Detergent Dispenser For Use With Solid Cast Detergent, incorporated herein by reference.

Figure 1:
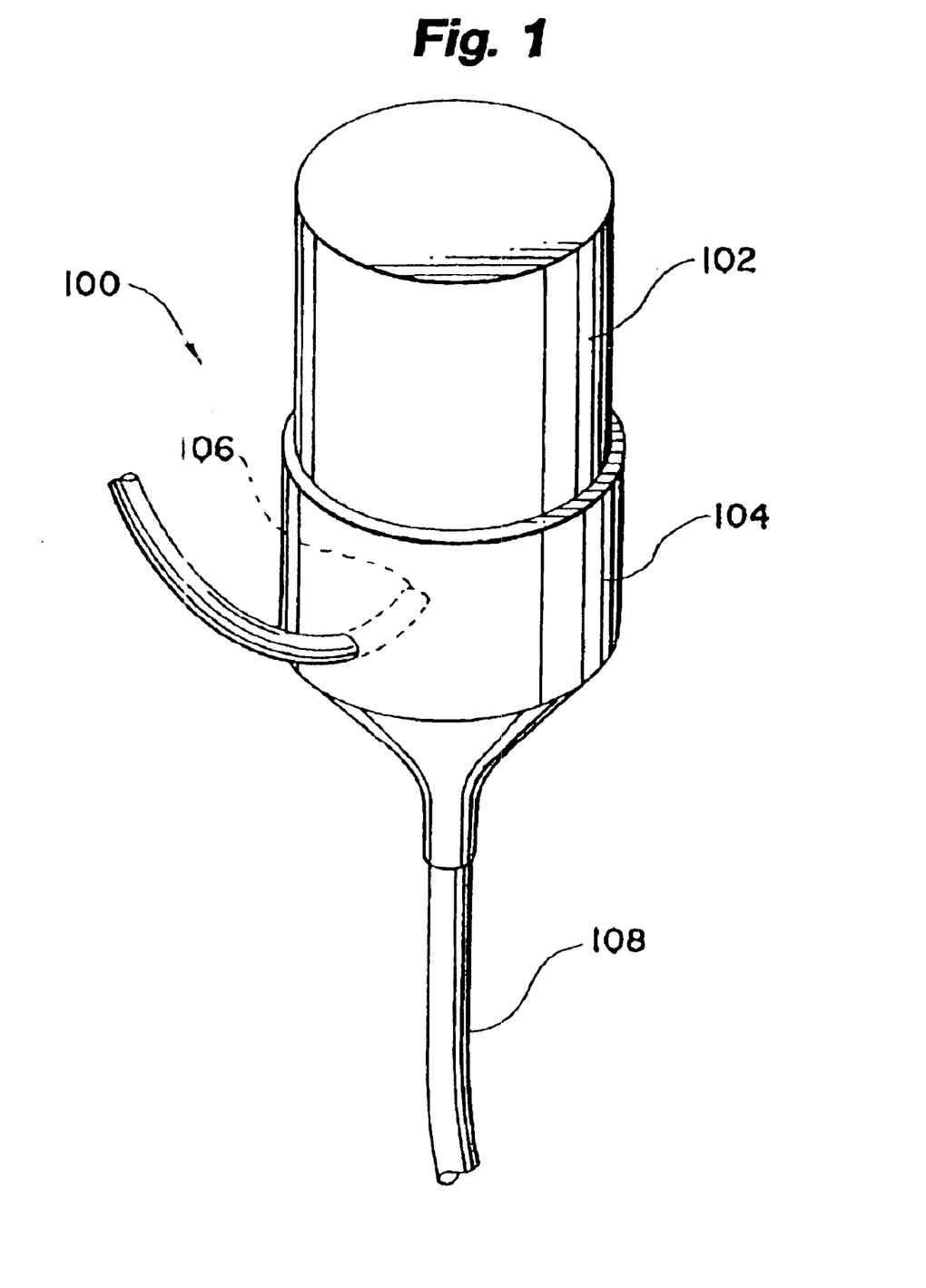
FIG. 1 is a schematic representation of a dispenser with a container filled with detergent within the invention with a tip for directing water into the open end of the container within the dispenser shown in broken lines.

An apparatus 100 for dispensing the solid detergent is schematically shown in FIG. 1. The container 102 of the solid detergent is inverted over a bowl 104. Water is sprayed from a tip 106 to dissolve the appropriate amount of detergent. The dissolved detergent runs down the bowl into a tube 108 for delivery to the appropriate location. There can be a screen between the sprayer and the detergent, but this is not preferred since the screen can reduce the effectiveness of the spray to dissolve the detergent.

The detergent solution runs out through a tube in the bottom of the bowl by gravity and/or suction. The solution flows through the tube either directly to a laundry machine, or to a collecting box where it is further mixed with water that carries or flushes the solution into a laundry machine, or to a receptacle used to hold the detergent solution for manual cleaning with a mop, brush, sponge, pad, rag, and the like, or to a flowing stream of water that feeds a hose or sprayer that is used to spray detergent solutions onto floors, walls, tables, food handling machinery and equipment, vehicles or any hard surface. Of course, other ways of dissolving the detergent from the container can be used.

Another method of use is based on solid blocks or tablets of the solid detergent. These blocks will generally range from 1 oz. to 5 lbs. One or more of these blocks are placed in a dispenser tub where water flows over the blocks, dissolving them to form a detergent solution. The detergent solution can be transferred to its use application by the methods mentioned above.

Washing tests were run on various detergent formulations in a top load washer using 1 ounce of detergent at 140° F. Test swatches were prepared by staining 6"×6" pieces of white 100% cotton and white 100% polyester (VISA) with grass, grape juice, barbecue sauce, French dressing, lipstick, shoe polish, ink, Hibiclens™. These tests showed various effectiveness of cleaning. The formulations with enzymes and oxygen bleach showed significantly better removal of the soils.

Enzyme activity in the use of the solid detergent was tested by the following procedures. The protease test involves the protease's ability to break large protein molecules into smaller protein molecules. A solution of gelatin (commonly available Knox Gelatin™) containing 20 g gelatin dissolved in 80 g hot water is prepared and kept at 120–140° F. to remain liquid. The pH is adjusted to 7–9 if needed. A 1% solution by weight of the detergent to be tested is made. Nine grams of detergent solution are added to the gelatin and inverted three times to mix.

The test tubes are allowed to set at room temperature for an hour. If the protease is present and active, the gelatin remains liquid. If there is no protease present or it is not active, the gelatin will solidify into a solid gel. A control is run with the test to be sure the gelatin solution solidifies properly. The protease test is generally pass/fail showing enzyme activity or no activity. Nevertheless, in some cases, partial or diminished activity is observed with the gelatin being a thick, very viscous liquid.

The amylase test involves the ability of amylase enzymes to solubilize starch. The test involves making 100 ml of a 1% solution by weight of the detergent to be tested. A piece of elbow macaroni is placed in the solution and stored 24 hours at room temperature. If the enzyme is present and active, the piece of macaroni is deteriorated and the solution becomes turbid or hazy. If the enzyme is absent or inactivated, the macaroni is soft but not deteriorated and the solution remains clear. No specific lipase test or cellulase test is performed. It is a good assumption that if protease and amylase activity are not lost, lipase activity will also not be lost.

In the examples presented below, percents are given relative to total detergent weight. All of the examples were performed by producing detergent at three different scales, with about 100 grams of detergent, about 1000 grams of detergent and about 50 pounds of detergent. The scale of detergent produced does not affect the relative concentrations of ingredients.

EXAMPLE 1

In a mixing vessel, about 8.5% of Nonylphenol (ethoxylate)$_{9.5}$ (T-Det N-9.5™ manufactured by Harcross) and 18.25% linear alcohol (ethoxylate)$_{100+}$ (Emulphogene TB-970™ manufactured by Rhone-Poulenc) were added and heated to 175° F. until melted. About 23.35% of sodium dodecylbenzene sulfonate (Calsoft 90F™ manufactured by Pilot) was added next with mixing to ensure dispersion while maintaining the fluidity of the batch. About 12.70% trisodium nitrilotriacetate 12.70% anhydrous sodium metasilicate, 0.5% optical brightener (Leukophor BMB™ Powder manufactured by Sandoz) and 1.5% Irish Spring™ fragrance (manufactured by Intercontinental Fragrances) were added and mixed until they were dispersed and the temperature of the batch cooled to 150° F. About 2.0% protease enzyme (Esperase 6.0T™ manufactured by Novo Nordisk A/S), 1.0% amylase enzyme (Termamnyl 60T™ manufactured by Novo Nordisk) and 19.5% sodium percarbonate were sequentially added while mixing to ensure dispersion and cooled to 145° F. for packaging. About 3% isopropanol was added to reduce viscosity and facilitate packaging. A 1% by weight solution of the final detergent product had a pH of 11.8.

Based on the above described tests, no loss of peroxide concentration or enzyme activity were found in solutions produced from the final detergent product.

EXAMPLE 2

In a mixing vessel, about 4.7% nonylphenol (ethoxylate)$_4$ (T-Det N-4™ by Harcross), 9.4% dinonylphenol (ethoxylate)$_{150}$ (Igepal DM-970™ manufactured by Rhone-Poulenc), 6.3% sodium linear $C_{12-15}$ alcohol (ethoxylate) sulfate, 60% water and alcohol solution (T-Det 25-3S™ manufactured by Harcross), and 7.0% coconut monoethanolamide (Alkamide CME™ manufactured by Rhone-Poulenc) were added and heated until the temperature reached 190° F. and the mixture melted. About 12.0% sodium dodecylbenzene sulfonate (Calsoft F-90™ manufactured by Pilot) was added while mixing and stirred until it was evenly dispersed. About 15.0% trisodium nitrilotriacetate, 39.6% anhydrous sodium metasilicate, 2.0% sodium polyacrylate, MW 4500 (Acusol 445ND™ manufactured by Rhom and Haas) and 2.0% brightener (Leukophor BMB™ Powder manufactured by Sandoz), Irish Spring™ perfume were added while mixing until they were evenly dispersed and the temperature cooled to 145° F. About 2.0% protease enzyme (Esperase 6.0T™ manufactured by Novo Nordisk) was added to the mixture and dispersed. Then, the detergent was packaged. None of the enzyme activity was lost according to the testing protocol described above. A 1% by weight solution of the final detergent product had a pH of 11.8.

EXAMPLE 3

Into a mixing vessel, about 6.7% linear $C_{12-15}$ alcohol (ethoxylate)$_3$ (Neodol 25-3™ manufactured by Shell), 9.4% linear $C_{16-20}$ alcohol (ethoxylate)$_{100+}$ (Emulphogene TB-970™ manufactured by Rhone-Poulenc), 6.5% sodium $C_{12-15}$ alcohol (ethoxylate)$_3$ sulfate, 60% water and alcohol solution (T-Det 25-3S™ manufactured by Harcross) and 12.0% lauric monoisopropanolamide (Monamid LIPA™ manufactured by Mona) were added and heated while mixing to a temperature of 205° F. until the mixture is liquified. About 7.0% sodium dodecylbenzenesulfonate (Calsoft 90™ manufactured by Pilot) was added next and mixed until evenly dispersed. About 4.0% amino tri(methylenephosphonic acid) and 2.0% sodium hydroxide were carefully mixed in a separate vessel and then added to the main mixture. About 15.0% tetrasodium ethylenediamine tetraacetate, 12.4% sodium carbonate, and 2.0% brightener (Leukophor BMB™ Powder manufactured by Sandoz), Irish Spring™ fragrance, dye (Nylanthrene Brilliant Blue 2RFF, manufactured by Crompton & Knowles) were added, mixed until evenly dispersed and the temperature dropped to 155° F. About 20.0% of sodium percarbonate was added which brought the temperature down to 145° F. About 2.0% protease enzyme (Esperase 6.0 T™ manufactured by Novo Nordisk) and 1.0% amylase enzyme (Termamyl 60™ by Novo Nordisk) were then added and blended until a uniform mixture was obtained and packaged. Solidification was complete in the packages in less than 4 hours.

Upon manufacture of the product, a sample was examined for the amount of enzyme activity, peroxide concentration using the protocols described above. The results indicated that no loss of enzyme activity had occurred. Furthermore, there was no loss of peroxides. The sample was re-tested after 130 days storage at room temperature and no loss of enzyme activity was observed. However, it had lost about 17.6% of its peroxide content. A 1% by weight solution of the final detergent product had a pH of 10.2.

EXAMPLE 4

The sample was produced as specified in Example 3, except that about 5.0% water was added after addition of the protease enzyme and amylase enzyme. Upon addition of the water, oxygen gas was liberated from the mixture demonstrating the instability of the production process with respect to, at least, peroxy bleaches in the presence of excess water.

EXAMPLE 5

In a mixing vessel, about 15.5% nonylphenol (ethoxylate)$_4$ (T-Det N-4™ manufactured by Harcross), 20.9% dinonylphenol (ethoxylate)$_{150}$ (Igepal DM-970™ manufactured by Rhone-Poulenc), and 5.0% ethylene glycol monobutyl ether were placed and heated to 160° F. until they melted. About 15.6% of sodium lauryl sulfate (Whitcolate A™ manufactured by Witco) was added to the mixture and stirred to obtain even dispersion. About 26.0% sodium tripolyphosphate, 5.0% of trisodium nitrilotriacetate and 10.0% of sodium dioctylsulfosuccinate (Aerosol OTB manufactured by Cytec) were added and mixed until evenly dispersed and the temperature cooled to 145° F. About 2.0% of protease enzyme (Eserase 6.0T™ manufactured by Novo Nordisk) was added, mixed. The detergent mixture was then packaged. No significant loss in enzyme activity was detected on the cooled, solidified product as determined by the protocols described above. A 1% solution of the final detergent product had a pH of 9.8.

Comparative Example 1

Enzymes obtained from manufactures were used to formulate liquid detergents. The enzymes were used within the parameters specified by the manufacturer. For example, the water content is kept below 45% and the pH was adjusted to be between 9.0–10.0 with acetic acid or triethanolamine. These formulations were tested for enzyme activity after varying lengths of storage at room temperature. The results in the table below show that formulations 6B and 6D, which contain the enzymes, are active at Day 1 and Day 7. However, by day 14 the enzyme activity is negligible.

TABLE 2

| Ingredients (grams) | 6A | 6B |
|---|---|---|
| water | 30.0 | 27.0 |
| nonylphenol (ethoxylate)$_{9.5}$ | 25.0 | 25.0 |
| sodium dodecylbenzene sulfonate | 5.0 | 5.0 |
| sodium xylene sulfonate 40% | 20.0 | 20.0 |
| Na$_4$ EDTA | 7.0 | 7.0 |
| propylene glycol | 10.0 | 10.0 |
| isopropanol | 5.0 | 5.0 |
| Esperase 8.0L ™ | 0.0 | 2.0 |
| Termamyl 300L ™ | 0.0 | 1.0 |

TABLE 3

| Ingredients (grams) | 6C | 6D |
|---|---|---|
| water | 35.0 | 32.0 |
| dodecylbenzene sulfonic acid | 20.0 | 20.0 |
| nonylphenol (ethoxylate)$_{12}$ | 10.0 | 10.0 |
| triethanolamine | 10.0 | 10.0 |
| isopropanol | 5.0 | 5.0 |
| tetrapotassium pyrophosphate | 10.0 | 10.0 |
| Esperase 8.0L ™ | 0.0 | 2.0 |
| Teramyl 300L ™ | 0.0 | 1.0 |

TABLE 4

| | Protease Activity | | |
|---|---|---|---|
| Composition | Day 1 | Day 7 | Day 14 |
| 6A | neg | neg | neg |
| 6B | pos | pos | neg[1] |
| 6C | neg | neg | neg |
| 6D | pos | pos | neg |
| Control, no detergent | neg | neg | neg |

[1]Slight activity, less than 20 percent of original activity, remained.

A The results above demonstrate that even if manufacturers' recommended conditions are followed, the presence of chelating agents greatly reduces enzyme activity of liquid detergents in less than two weeks of storage.

I claim:

1. A method of cleaning laundry, comprising:
   dissolving at least a portion of a solid cast detergent composition thereby forming a detergent solution, the detergent composition solidified from a melt and comprising a nonionic surfactant, a peroxide bleaching agent, and an active enzyme;
   flowing the detergent solution into a laundry machine containing laundry; and
   agitating the laundry and detergent solution within the laundry machine.

2. The method of claim 1, in which the dissolved solid cast detergent is essentially homogeneous.

3. The method of claim 1, further comprising diluting the detergent solution before flowing the detergent solution into the laundry machine.

4. The method of claim 1, in which the detergent composition is solidified in a container, the container with an opening for admitting a spray therethrough, and
   in which dissolving at least a portion of the solid cast detergent composition comprises directing the spray through the container opening and onto a surface of the solid cast detergent composition.

5. The method of claim 4, in which the container is configured to be received in a bowl of a dispenser, and
   in which the detergent solution is flowed from the container into the dispenser bowl and from the dispenser bowl into the laundry machine.

6. The method of claim 5, in which a tube extends between the dispenser bowl and the laundry machine, and
   in which the detergent solution is flowed from the dispenser bowl to the laundry machine through the tube.

7. The method of claim 1, the dissolved detergent composition further comprising a total surfactant amount between about 30 and 99 percent by weight of the detergent composition.

8. The method of claim 1, in which the nonionic surfactant is present in an amount at least about 21.1 percent by weight of the detergent composition.

9. The method of claim 1, the dissolved detergent composition further comprising an anionic surfactant.

10. The method of claim 9, the anionic surfactant present in an amount at least about 10.9 percent by weight of the detergent composition.

11. The method of claim 1, the dissolved detergent composition further comprising not more than about 5 percent free water by weight of the detergent composition.

12. The method of claim 11, the dissolved detergent composition formed by cooling the melt before adding said enzyme.

13. The method of claim 1, in which the peroxide bleaching agent in the dissolved solid cast detergent composition is an alkali metal perborate, an alkali metal percarbonate, a benzoyl peroxide, a dicumyl peroxide, a di(2-tert-butyl peroxy isopropyl) benzene, an organic peroxy acid, or any combination thereof.

14. The method of claim 1, in which a 1 percent concentration of the detergent solution has a pH between about 10.2 and 12.2.

15. The method of claim 1, in which a 1 percent concentration of the detergent solution has a pH between about 11.8 and 12.2.

16. The method of claim 1, in which a 1 percent concentration of the detergent solution has a pH between about 11.8 and 12.2.

17. The method of claim 1, in which the active enzyme is a protease enzyme, an amylase enzyme, a cellulase enzyme, or a lipase enzyme.

18. A method of cleaning laundry, comprising:
   dissolving at least a portion of a solid cast detergent composition thereby forming a detergent solution, the detergent composition solidified from a melt and comprising a nonionic surfactant and a peroxide bleaching agent;
   flowing the detergent solution into a laundry machine containing laundry to be cleaned; and
   agitating the laundry and detergent solution within the laundry machine.

19. The method of claim 18, in which the peroxide bleaching agent in the dissolved solid cast detergent composition is an alkali metal perborate, an alkali metal percarbonate, a benzoyl peroxide, a dicumyl peroxide, a di(2-tert-butyl peroxy isopropyl) benzene, an organic peroxy acid, or any combination thereof.

20. The method of claim 18, in which the dissolved solid cast detergent composition is essentially homogeneous.

21. The method of claim 18, further comprising diluting the detergent solution before flowing the detergent solution into the laundry machine.

22. The method of claim 20, in which the detergent solution is solidified in a container, the container with an opening for admitting a spray therethrough, and
   in which dissolving at least a portion of the solid cast detergent composition comprises directing the spray through the container opening on onto a surface of the solid cast detergent composition.

23. The method of claim 22, in which the container is configured to be received in a bowl of a dispenser, and in which the detergent solution is flowed from the container into the dispenser bowl and from the dispenser bowl into the laundry machine.

24. The method of claim 23, in which a tube extends between the dispenser bowl and the laundry machine, and
   in which the detergent solution is flowed from the dispenser bowl to the laundry machine through the tube.

25. The method of claim 18, the dissolved detergent composition further comprising a total surfactant amount between about 30 and 99 percent by weight of the detergent composition.

26. The method of claim 18, in which the nonionic surfactant is present in an amount at least about 21.1 percent by weight of the detergent composition.

27. The method of claim 18, in which the dissolved detergent composition further comprises an anionic surfactant.

28. The method of claim 27, the anionic surfactant present in an amount at least about 10.9 percent by weight of the detergent composition.

29. The method of claim 18, the detergent composition further comprising not more than about 5 percent free water by weight of the detergent composition.

30. The method of claim 18, the detergent composition formed by cooling the melt before adding the peroxide bleaching agent.

31. The method of claim 30, the dissolved detergent composition further comprising an active enzyme.

32. The method of claim 31, in which the active enzyme is a protease enzyme, an amylase enzyme, a cellulase enzyme, or a lipase enzyme.

33. The method of claim 18, in which a 1 percent concentration of the detergent solution has a pH between about 10 and 12.2.

34. The method of claim 18, in which a 1 percent concentration of the detergent solution has a pH between about 11.0 and 12.2.

35. The method of claim 18, in which a 1 percent concentration of the detergent solution has a pH between about 11.8 and 12.2.

* * * * *

UNITED STATES PATENT AND TRADEMARK OFFICE
CERTIFICATE OF CORRECTION

PATENT NO. : 6,777,383 B1
DATED : August 17, 2004
INVENTOR(S) : Scepanski

It is certified that error appears in the above-identified patent and that said Letters Patent is hereby corrected as shown below:

Title page,
Item [60], Related U.S. Application Data, please delete the words "This is a Continuation of application Ser. No. 09/906,504, filed on Jul. 16," and insert in its place -- This is a Continuation of application Ser. No. 09/906,541, filed on Jul. 16, --.

Column 1,
Line 4, please delete the words "This is a Continuation of application Ser. No. 09/906,504" and insert in its place -- This is a Continuation of application Ser. No. 09/906,541 --.

Signed and Sealed this

Twenty-third Day of August, 2005

JON W. DUDAS
*Director of the United States Patent and Trademark Office*